US011870810B2

(12) United States Patent
Byrne (10) Patent No.: US 11,870,810 B2
(45) Date of Patent: Jan. 9, 2024

(54) HOST-BASED NETWORK SOCKET SECURITY CONTROLS AND TELEMETRY

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 460 days.

(21) Appl. No.: 16/910,776

(22) Filed: Jun. 24, 2020

(65) Prior Publication Data

US 2021/0409448 A1 Dec. 30, 2021

(51) Int. Cl.
*H04L 9/40* (2022.01)

(52) U.S. Cl.
CPC .................................. *H04L 63/20* (2013.01)

(58) Field of Classification Search
CPC ....................................................... H04L 63/20
USPC ............................................................. 726/1
See application file for complete search history.

(56) References Cited

U.S. PATENT DOCUMENTS

| 8,407,758 | B2 | 3/2013 | Byres et al. |
| 8,775,802 | B1 * | 7/2014 | Kargman .............. G06F 21/556 |
| | | | 713/166 |
| 8,925,093 | B2 | 12/2014 | Ali-Ahmad et al. |
| 8,973,089 | B2 | 3/2015 | Ma et al. |
| 10,277,557 | B1 * | 4/2019 | Chandrasekharan ... H04L 45/74 |

* cited by examiner

*Primary Examiner* — Anthony D Brown
(74) *Attorney, Agent, or Firm* — Lee & Hayes, P.C.

(57) ABSTRACT

An electronic device includes a network communications interface, a processor, and a memory configured to store instructions that, when executed by the processor, cause the processor to instantiate a set of processes; receive, over a network and via the network communications interface, a policy for network socket creation; receive, from the set of processes, a set of requests to create a first set of network sockets used to communicate over the network via the network communications interface; collect telemetry pertaining to a second set of network sockets used to communicate over the network via the network communications interface; allow or block creation of network sockets in the first set of network sockets, in accordance with the collected telemetry and the policy for network socket creation; and transmit at least part of the collected telemetry to a controller, over the network and via the network communications interface.

20 Claims, 5 Drawing Sheets

FIG. 5

HOST-BASED NETWORK SOCKET SECURITY CONTROLS AND TELEMETRY

FIELD

Embodiments described herein relate to network security.

BACKGROUND

Electronic devices such as phones, computers, and even Internet of Things (IoT) devices have become ubiquitous. So too have electronic attacks on such devices. Network security threats include, for example, viruses, spoofing, eavesdropping, phishing, and many other types of threats. Often, a firewall or antivirus software is used to mitigate or prevent such threats.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that provide network security for host devices such as phones, computers, or Internet of Things (IoT) devices. In contrast to many conventional network security systems, which operate at the packet level, the systems, methods, devices, and apparatus described herein operate primarily at the socket level, before packets are created (for outbound network communications) or consumed (for inbound communications).

More specifically, an electronic device is disclosed. The electronic device may include a network communications interface, a processor, and a memory in communication with the processor. The memory may be configured to store instructions that, when executed by the processor, cause the processor to instantiate a set of processes; receive, over a network and via the network communications interface, a policy for network socket creation; receive, from the set of processes, a set of requests to create a first set of network sockets used to communicate over the network via the network communications interface; collect telemetry pertaining to a second set of network sockets used to communicate over the network via the network communications interface; allow or block creation of network sockets in the first set of network sockets, in accordance with the collected telemetry and the policy for network socket creation; and transmit at least part of the collected telemetry to a controller, over the network and via the network communications interface.

A server is also disclosed. The server may include a network communications interface, a processor, and a memory in communication with the processor. The memory may be configured to store instructions that, when executed by the processor, cause the processor to receive, via the network communications interface, telemetry pertaining to creation or use of a set of network sockets used by at least one host device to communicate over a network; create or update a policy for network socket creation using the telemetry; and transmit the policy for network socket creation via the network communications interface to a host device.

Still further, a method of providing network security for at least one host device is also disclosed. The method may include receiving at a server, over a network and from at least one host device, telemetry pertaining to creation or use of a set of network sockets used by the at least one host device to communicate over a network; creating or updating, at the server and using the telemetry, a policy for network socket creation; and transmitting the policy for network socket creation over the network to a host device.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Most network security technologies are based on stateful inspection of a host device's internet packet firewall, or on host-based antivirus software. Both of these technologies are packet-focused. That is, a locally-executed process creates a packet and attempts to transmit it, or a packet is received from a remote process executing on a remote device, and then one or more security technologies inspect the packet to determine whether the packet should be transmitted or consumed. Techniques described herein provide network security controls at the socket level (or socket layer), prior to and during network socket creation, and before packet creation or consumption. In other words, instead of waiting for a process to form an IP packet that needs to be parsed and ultimately gets blocked (e.g., blocked from transmission or blocked from consumption), the process is blocked from forming a network socket to transmit or receive packets when the process is not explicitly allowed to form a network socket and, thus, the process will likely never form or receive the packets. The described techniques can resolve problematic behavior by finding and isolating the process that is the source of the problematic behavior.

In some cases, a host device may collect telemetry pertaining to the creation and/or use of network sockets and transmit the telemetry to a control server for analysis and trending. In some cases, the control server may provide an initial policy for network socket creation to the host device and may update the policy using the telemetry. The initial policy may be developed using telemetry received from other host devices, and the updated policy may be developed using the telemetry received from the host device and/or the telemetry received from other host devices.

Figure 1:
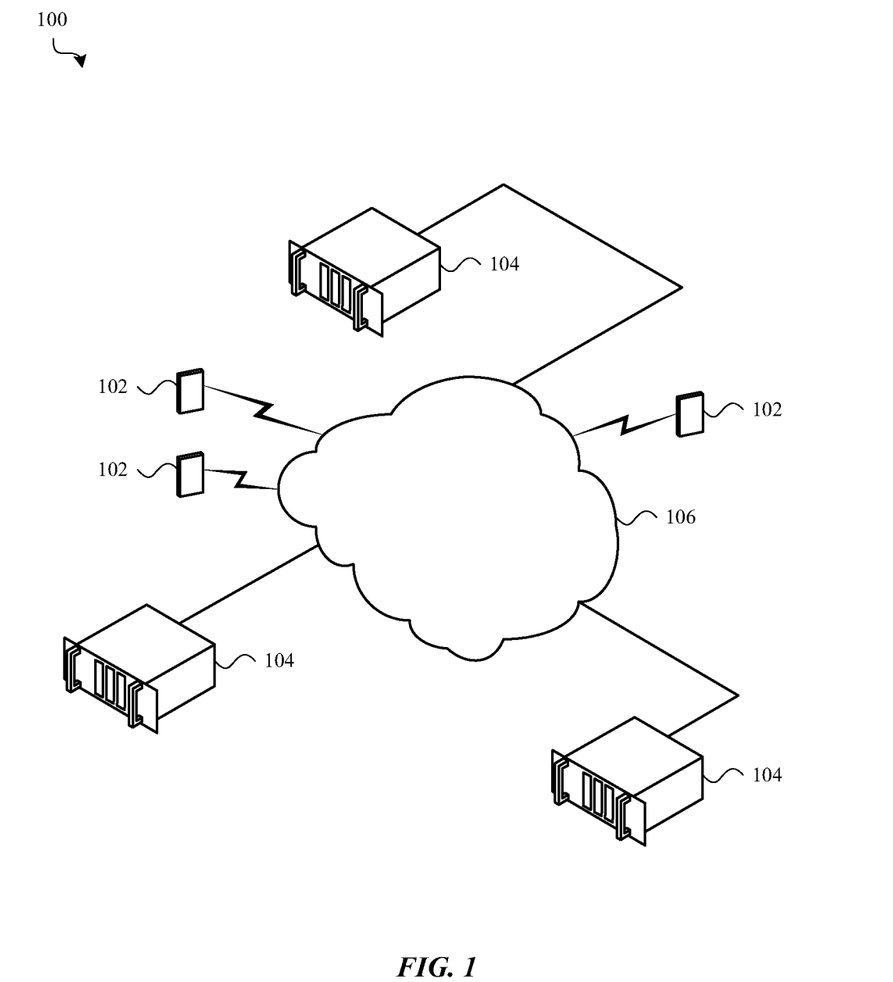
FIG. 1 shows an example set of networked devices, including a set of host devices and a set of servers that are configured to provide network security for the set of host devices.

FIG. 1 shows an example set of networked devices 100. The devices 100 include a set of host devices 102 and a set of servers (e.g., control servers) 104. The devices 100 may be connected in various ways, via one or more networks such as the Internet, one or more local area networks (LANs), one or more wide area networks (WANs), and so on. The one or more networks are referred to herein, generally, as simply a network 106. The network 106 is illustrated as a cloud in FIG. 1.

The host devices 102 and servers 104 may be configured to provide network security for the set of host devices 102. Although multiple host devices 102 and servers 104 are shown, a single server 104 and a set of host devices 102 may be configured to provide network security for the set of host devices 102 in some embodiments. Alternatively, a single server 104 may be configured to provide network security for a single host device 102.

The host devices 102 may take various forms, and in some cases may include one or more phones (e.g., smartphones); computers (e.g., desktop computers, laptop computers, tablet computers, and so on); or Internet of Things (IoT) devices (e.g., sensors, appliances, controllers, and so on). The host devices 102 may be stationary or mobile. A host device 102 may have a graphical user interface (GUI) or other video, audio, or tactile-based user interface that enables a user to interact with the host device 102. However, a host device 102 need not have a GUI or other user interface (e.g., in the case of an IoT sensor or controller that communicates with a server 104 over the network 106 and is not configured for direct interaction with a user).

All of the host devices 102 may have some sort of network communications interface and, in some cases, a host device 102 may have more than one network communications interface. A host device 102 may include a wireless network communications interface and/or a wired network communications interface. Example communication protocols that may be used by a wireless network communications interface include Institute of Electrical and Electronics Engineers (IEEE) 802.11 communication protocols (i.e., Wi-Fi protocols), cellular communication protocols (e.g., a Third Generation Partnership Project Fifth Generation New Radio (3GPP 5G NR) communication protocol or a 3GPP Fourth Generation (3GPP 4G or 3GPP Long Term Evolution (LTE)) communication protocol), or a BLUETOOTH™ communication protocol. Example communication protocols that may be used by a wireless or wired network communications interface include Transmission Control Protocol or Internet Protocol (TCP/IP), and so on.

The servers 104 may also take various forms and may include rack-mounted servers in data centers, equipment closets, or equipment cabinets; desktop servers in an office environment; and so on. A server 104 may have a local display that presents a GUI for interacting with the server 104, or a remote display associated with a phone or computer that receives information served by, or fetched from, the server 104.

Figure 2:
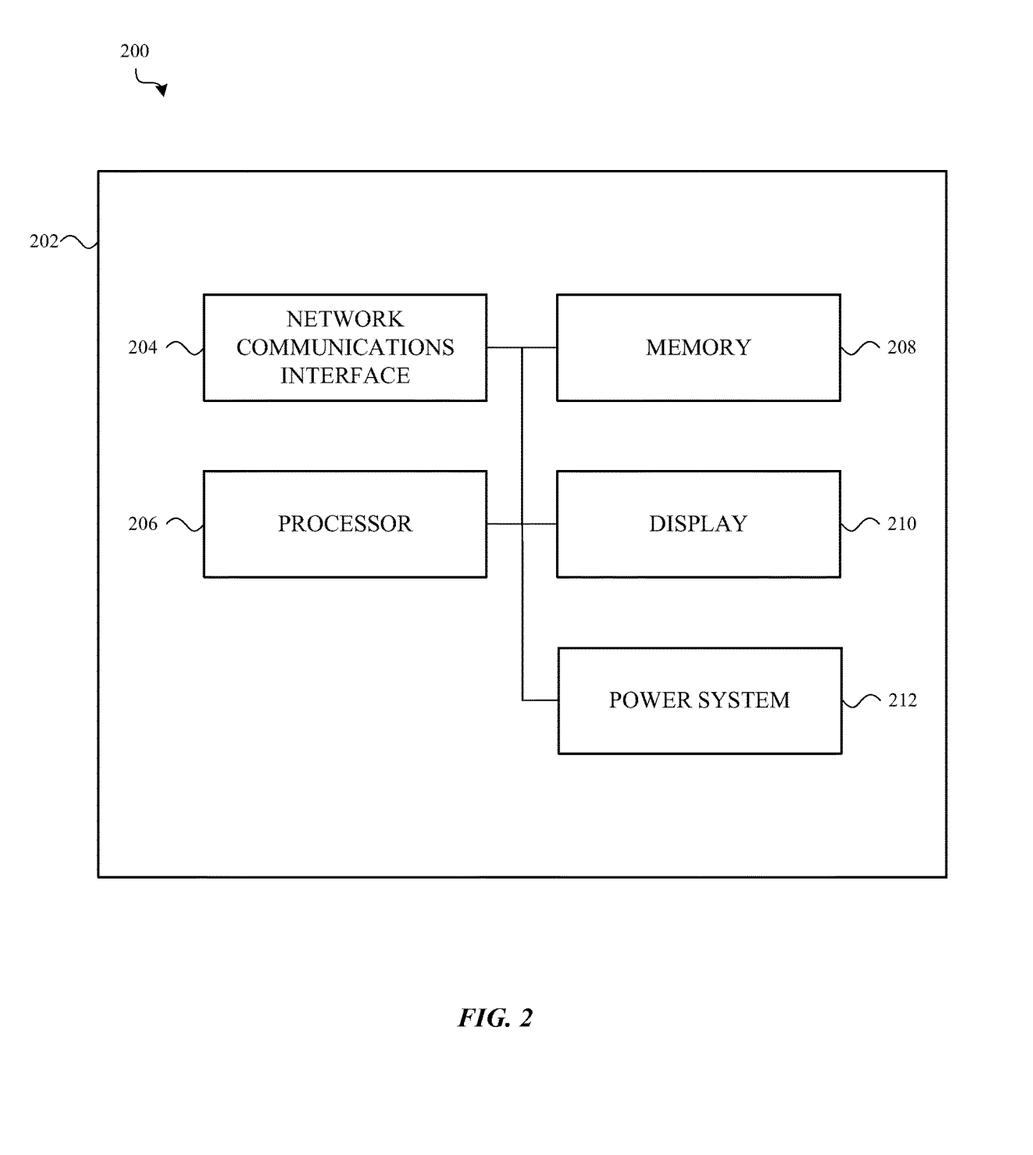
FIG. 2 shows an example block diagram of an electronic device.

FIG. 2 shows an example block diagram of an electronic device 200. The electronic device 200 (or device) is an example of one of the host devices described with reference to FIG. 1. The electronic device 200 may include a housing 202. A network communications interface 204, processor 206, and memory 208 may be mounted to (or within) the housing 202.

The housing 202 may include one or more components formed, for example, of metal, plastic, glass, or other materials. In some cases, the housing 202 may include a transparent cover formed, for example, of glass, plastic, or sapphire. An optional display 210 may be mounted within the housing 202 and may be viewed through the transparent cover. In some cases, the processor 206 may cause the display 210 to display a GUI or other user interface.

The network communications interface 204 may be the sole network communications interface for the electronic device 200 or one of two or more network communications interfaces for the electronic device 200. The network communications interface 204 may include a wireless communications interface or a wired communications interface. Example communication protocols that may be used by a wireless network communications interface include Wi-Fi, cellular, or BLUETOOTH™ communication protocols. Example communication protocols that may be used by a wireless or wired network communications interface include TCP/IP, and so on.

The processor 206 may include one or more of an integrated circuit (IC), a discrete circuit, an application-specific integrated circuit (ASIC), a System-on-Chip (SoC), and so on.

The memory 208 may include cache memory or other non-persistent memory and/or permanent or other persistent memory. The memory 208 may be in communication with the processor 206 and may be configured to store instructions that, when executed by the processor 206, cause the processor 206 to perform various operations. The stored instructions may correspond, for example, to instructions of an operating system and/or one or more processes (e.g., applications, applets, routines, and so on).

The display 210 may include an integrated display (e.g., in the case of a phone) or a detached display (e.g., in the case of some computers). The display 210 may be a light emitting diode (LED) display, an organic LED (OLED) display, or other form of electroluminescent display.

The electronic device 200 may include a power system 212 that includes one or more of a battery, a charging port (e.g., a wired or wireless charging port), a wired power connector (e.g., a power cord connector), and so on. The power system 212 may also include a power distribution system for providing power to the network communications interface 204, processor 206, memory 208, and display 210.

Figure 3:
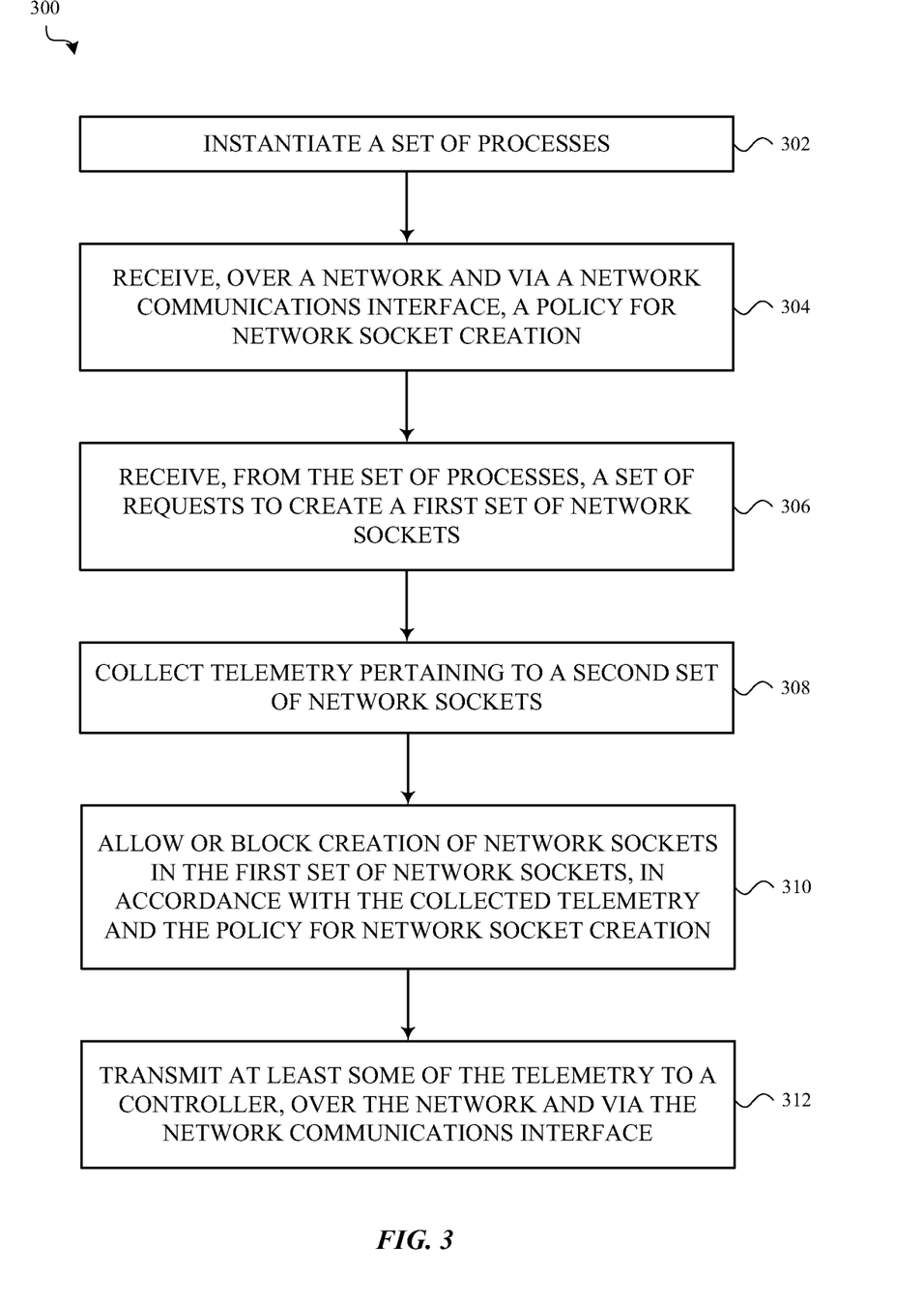
FIG. 3 shows an example method that may be executed by a host device to provide network security for the host device.

FIG. 3 shows an example method 300 that may be executed by a host device to provide network security for the host device. In some cases, the method 300 may be performed by a processor of one of the host devices described with reference to FIG. 1, or by the processor of the electronic device described with reference to FIG. 2.

At block 302, the method 300 may include instantiating a set of processes.

At block 304, the method 300 may include receiving, over a network and via a network communications interface, a policy for network socket creation. In some embodiments, the policy for network socket creation may identify a process (or set of processes) that is allowed to create network sockets and/or a process (or set of processes) that is prohibited from creating network sockets. In some embodiments, the policy for network socket creation may indicate a first set of port numbers or a first set of IP addresses that a process is allowed to use when requesting creation of a network socket, and/or a second set of port numbers or a second set of IP addresses that a process is prohibited from using when requesting creation of a network socket. In some embodiments, the policy for network socket creation may indicate a first set of times when a process is allowed to request creation of a network socket, and/or a second set of times when a process is prohibited from requesting creation of a network socket.

At block 306, the method 300 may include receiving, from the set of processes, a set of requests to create (or open) a first set of network sockets (e.g., a set of socket calls). The first set of network sockets may be used to communicate over the network via the network communications interface.

At block 308, the method 300 may include collecting telemetry pertaining to a second set of network sockets. The second set of network sockets may also be used to communicate over the network via the network communications interface. In some cases, the second set of network sockets may include the first set of network sockets. The telemetry may pertain to both inbound and outbound network connections. In some cases, the telemetry may be analyzed or trended locally. In some cases, the telemetry may be analyzed or trended remotely.

In some cases, part or all of the telemetry may pertain to creation of the second set of network sockets (or attempts to create the first set of network sockets). In these cases, the telemetry may include, for example, first indicators of users or processes generating the set of requests; second indicators of port numbers associated with the set of requests; third indicators of Internet Protocol (IP) addresses associated with the set of requests; and/or fourth indicators of times associated with the set of requests. The telemetry may also include indicators of blocked requests to create network sockets and/or indicators of allowed requests to create network sockets.

In some cases, part or all of the telemetry may pertain to use of the second set of network sockets. In these cases, the telemetry may include, for example, a type of file accessed via a network socket; a file name accessed via a network socket; a time of use of a network socket; a location of use of a network socket; and/or a use profile for a network socket.

In some embodiments, some or all of the telemetry may be collected using the Linux™ List of Open Files (lsof) command (or similar commands). The lsof command will return a current system state.

At block 310, the method 300 may include allowing or blocking creation (or opening) of network sockets in the first set of network sockets, in accordance with the collected telemetry and the policy for network socket creation (i.e., the method 300 may use the collected telemetry to enforce the policy for network socket creation). The allowing or blocking of network socket creation may be enforced at the sockets layer of a host device's operating system (OS), or at an application programming interface (API) between a process (e.g., an application) and the host device's OS (e.g., an API between the process and network level controls). When a network socket has been opened prior to a policy update that does not allow the network socket to be created, or when a network socket is opened through error, the network socket may be disconnected when discovered. When telemetry analyzed by an agent running locally on the host device, or remotely by a control server (and possibly telemetry gathered from multiple host devices), indicates that a network socket is suspected of nonconforming or undesirable network behavior (e.g., network behavior that does not conform to past trends, or trends of similar host devices), the agent or control server may trigger an alarm, seek input from a network professional, and/or log activity of or disconnect the network socket.

At block 312, the method 300 may include transmitting at least some of the telemetry to a controller, over the network and via the network communications interface.

In some cases, the method 300 may be performed by an agent instantiated on (i.e., operating on) a host device. The agent may be controlled by a remote server, such as a server that provides the policy for network socket creation and/or receives the telemetry transmitted by the host device. The "server" may be a single server, or a consolidated or distributed collection of servers that cooperate to collect telemetry from host devices and/or create or update policies for network socket creation.

Figure 4:
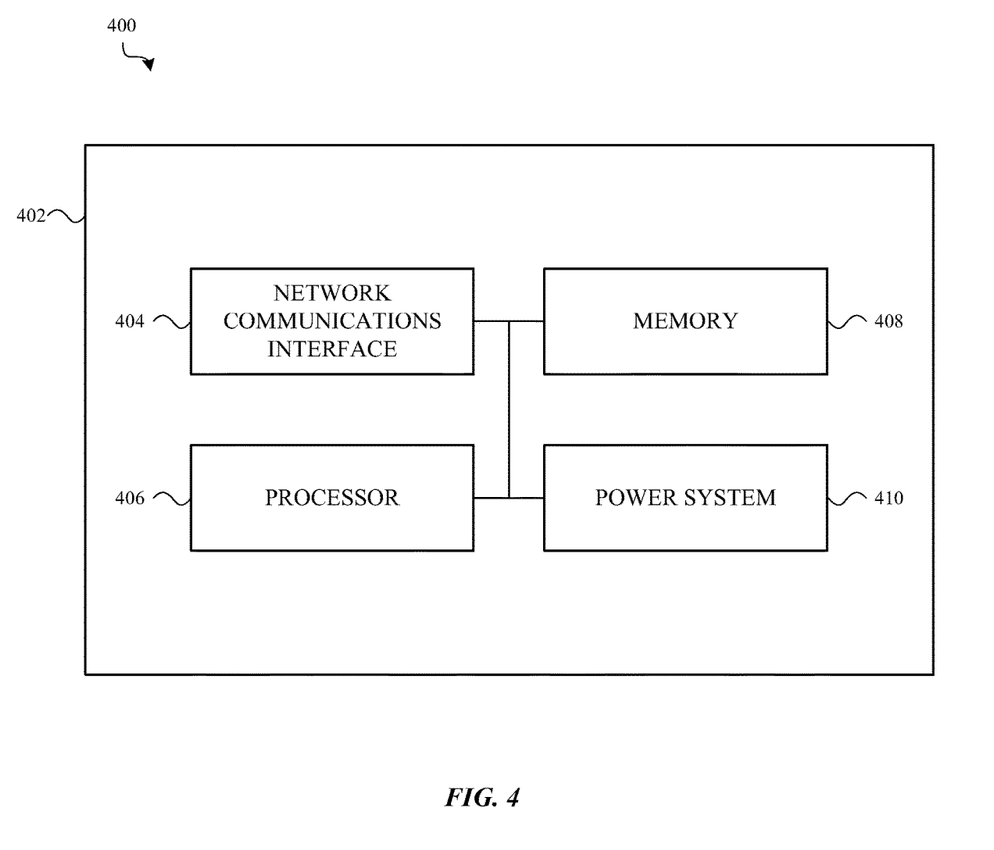
FIG. 4 shows an example block diagram of a server.

FIG. 4 shows an example block diagram of a server 400. The server 400 (or control server) is an example of one of the servers described with reference to FIG. 1. The server 400 may include a housing 402. A network communications interface 404, processor 406, and memory 408 may be mounted to (or within) the housing 402.

The housing 402 may include one or more components formed, for example, of metal, plastic, or other materials.

The network communications interface 404 may be the sole network communications interface for the server 400 or one of two or more network communications interfaces for the server 400. The network communications interface 404 may include a wireless communications interface or a wired communications interface. Example communication protocols that may be used by a wireless network communications interface include Wi-Fi, cellular, or BLUETOOTH™ communication protocols. Example communication protocols that may be used by a wireless or wired network communications interface include TCP/IP, and so on.

The processor 406 may include one or more of an IC, a discrete circuit, an ASIC, an SoC, and so on.

The memory 408 may include cache memory or other non-persistent memory and/or permanent or other persistent memory. The memory 408 may be in communication with the processor 406 and may be configured to store instructions that, when executed by the processor 406, cause the processor 406 to perform various operations. The stored instructions may correspond, for example, to instructions of an operating system and/or one or more processes (e.g., applications, applets, routines, and so on).

The server 400 may include a power system 410 that includes one or more of a battery, a charging port (e.g., a wired or wireless charging port), a wired power connector (e.g., a power cord connector), and so on. The power system 410 may also include a power distribution system for providing power to the network communications interface 404, processor 406, and memory 408.

Figure 5:
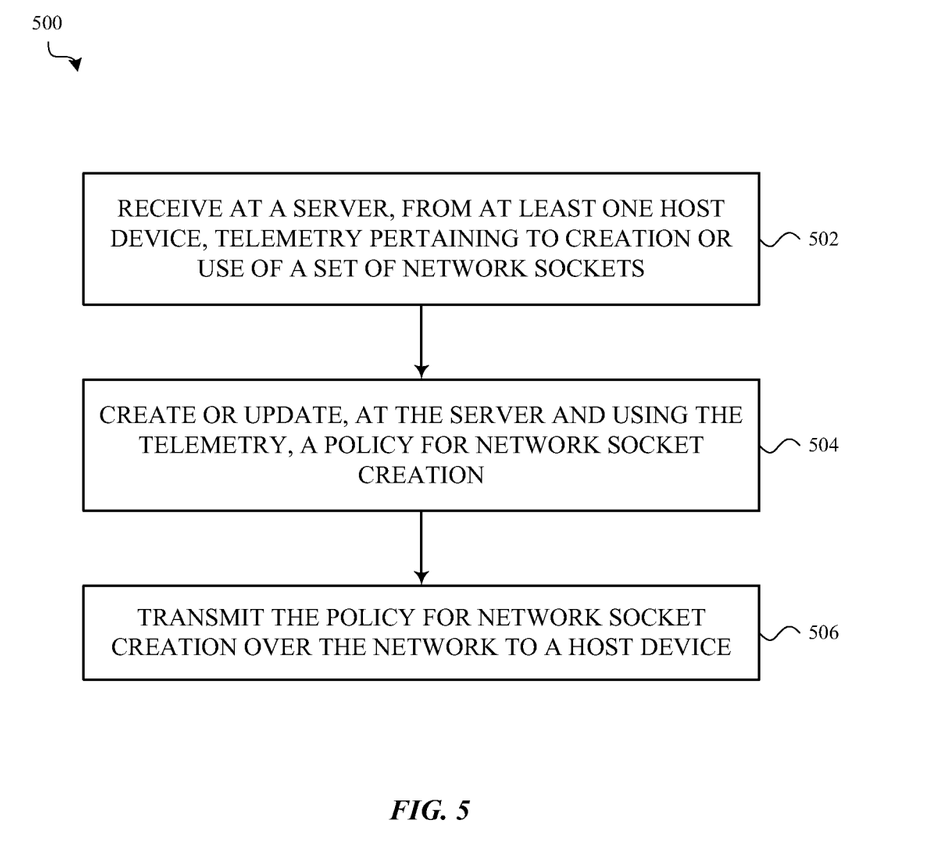
FIG. 5 shows an example method that may be executed by a control server to provide network security for at least one host device.

FIG. 5 shows an example method 500 that may be executed by a server (e.g., a control server) to provide network security for at least one host device. In some cases, the method 500 may be performed by a processor of one of the servers described with reference to FIG. 1, or by the processor of the server described with reference to FIG. 4. In some cases, the at least one host device may include at least one of the host devices described with reference to FIG. 1, or the host device described with reference to FIG. 2.

At block 502, the method 500 may include receiving at a server, from at least one host device, telemetry pertaining to creation or use of a set of network sockets. The set of network sockets may be used by the at least one host device to communicate over a network. In some cases, the set of network sockets may be associated with a single host device. In other cases, the set of network sockets may be associated with a set of multiple host devices. The telemetry may be received at the server over a network, via a network communications interface.

In some cases, part or all of the telemetry may pertain to creation of the second set of network sockets (or attempts to create the first set of network sockets). In these cases, the telemetry may include, for example, first indicators of users or processes generating the set of requests; second indicators of port numbers associated with the set of requests; third indicators of Internet Protocol (IP) addresses associated with the set of requests; and/or fourth indicators of times associated with the set of requests. The telemetry may also include indicators of blocked requests to create network sockets and/or indicators of allowed requests to create network sockets.

In some cases, part or all of the telemetry may pertain to use of the second set of network sockets. In these cases, the telemetry may include, for example, a type of file accessed via a network socket; a file name accessed via a network socket; a time of use of a network socket; a location of use of a network socket; and/or a use profile for a network socket.

At block 504, the method 500 may include creating or updating, at the server and using the telemetry, a policy for network socket creation. In some cases, the policy for network socket creation may be created or updated globally, by aggregating the telemetry received from multiple host devices and developing a uniform policy for all host devices. Alternatively, a policy for network socket creation may be created or updated per host device, in response to the host device's telemetry (or in response to the telemetry received from all or a subset of host devices). Alternatively, a portion of the policy for network socket creation may be created or updated globally, and one or more other portions of the policy for network socket creation may be created or updated for individual ones or subsets of host devices.

In some embodiments, the policy for network socket creation may identify a process (or set of processes) that is allowed to create network sockets and/or a process (or set of processes) that is prohibited from creating network sockets. In some embodiments, the policy for network socket creation may indicate a first set of port numbers or a first set of IP addresses that a process is allowed to use when requesting creation of a network socket, and/or a second set of port numbers or a second set of IP addresses that a process is prohibited from using when requesting creation of a network socket. In some embodiments, the policy for network socket creation may indicate a first set of times when a process is allowed to request creation of a network socket, and/or a second set of times when a process is prohibited from requesting creation of a network socket.

The policy for network socket creation defines acceptable network behavior for creating network sockets. In some cases, the policy may define 1) a known good baseline for acceptable network behavior, and 2) thresholds for allowed departures from the baseline. For example, if a particular type of process typically issues a request to create a network socket during the afternoon on workdays, the policy for network socket creation may allow the process to create a network socket during the workday (e.g., from 8:00 am-5:00 pm) without triggering an alarm, but may trigger an alarm and not allow the process to create a network socket in the evening or on weekends. As another example, a process that typically requests to create a network socket using a particular port number may only be allowed to create a network socket using the particular port number and may not be allowed to create a network socket using any other port number. As yet another example, a process may be allowed to create a network socket for communication over an internal network (e.g., an office network) but not create a network socket for communication over the Internet, or a web browser application may be allowed to create network sockets but a calculator program may not.

In some cases, a policy for network socket creation may be created or updated by means of the server analyzing or trending telemetry. For example, the server may look at what network sockets a user or process typically creates in a day, week, month, particular part of a day, and so on. When the user or process typically creates network sockets during the day, a request to create a network socket at night (e.g., substantially after normal business hours) may be blocked, and an alarm may be triggered.

At block 506, the method 500 may include transmitting the policy for network socket creation over the network (e.g., via the network communications interface) to a host device. In some cases, the operations at block 506 may include transmitting the policy for network socket creation to each host device of the at least one host device.

The "server" described with reference to FIG. 5 may be a single server, or a consolidated or distributed collection of servers that cooperate to collect telemetry from host devices and/or create or update policies for network socket creation. In some embodiments, the method 500 may include instantiating an agent on each of one or more host devices and configuring or operating the agent to enforce the policy for network socket creation of the host device(s) and collect the telemetry from the host device(s).

In some embodiments, the order of operations in the described methods may be performed in different orders or include more or fewer operations. In some embodiments, various operations of the methods may be performed contemporaneously or in parallel.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a network communications interface;
a processor; and
a memory in communication with the processor and configured to store instructions that, when executed by the processor, cause the processor to,
instantiate a set of processes;
receive, over a network and via the network communications interface, a policy for network socket creation;
receive, from the set of processes, a set of requests to create a first set of network sockets used to communicate over the network via the network communications interface;
collect telemetry pertaining to a second set of network sockets used to communicate over the network via the network communications interface;
allow or block creation of network sockets in the first set of network sockets, in accordance with the collected telemetry and the policy for network socket creation; and
transmit at least some of the telemetry to a controller, over the network and via the network communications interface.

2. The electronic device of claim 1, wherein the telemetry includes at least one of:
first indicators of users or processes generating the set of requests;
second indicators of port numbers associated with the set of requests;
third indicators of Internet Protocol (IP) addresses associated with the set of requests; or
fourth indicators of times associated with the set of requests.

3. The electronic device of claim 1, wherein the telemetry includes at least one of:
a type of file accessed via a network socket;
a file name accessed via a network socket;
a time of use of a network socket;
a location of use of a network socket; or
a use profile for a network socket.

4. The electronic device of claim 1, wherein the telemetry includes at least one of;
indicators of blocked requests to create network sockets; or
indicators of allowed requests to create network sockets.

5. The electronic device of claim 1, wherein the second set of network sockets includes the first set of network sockets.

6. The electronic device of claim 1, wherein the policy for network socket creation identifies at least one of:
a process allowed to create network sockets; or
a process prohibited from creating network sockets.

7. The electronic device of claim 1, wherein the policy for network socket creation indicates at least one of:
a first set of port numbers or a first set of IP addresses that a process is allowed to use when requesting creation of a network socket; or
a second set of port numbers or a second set of IP addresses that a process is prohibited from using when requesting creation of a network socket.

8. The electronic device of claim 1, wherein the policy for network socket creation indicates at least one of:
a first set of times when a process is allowed to request creation of a network socket; or
a second set of times when a process is prohibited from requesting creation of a network socket.

9. A server, comprising:
a network communications interface;
a processor; and
a memory in communication with the processor and configured to store instructions that, when executed by the processor, cause the processor to,
receive, over a network and via the network communications interface, telemetry pertaining to creation or use of a set of network sockets used by at least one host device to communicate over the network;
create or update a policy for network socket creation using the telemetry; and
transmit the policy for network socket creation over the network, via the network communications interface, to a host device.

10. The server of claim 9, wherein:
the telemetry pertains, at least in part, to creation of the set of network sockets; and
the telemetry comprises at least one of:
first indicators of users or processes generating a set of requests to create the set of network sockets;
second indicators of port numbers associated with the set of requests;
third indicators of Internet Protocol (IP) addresses associated with the set of requests; or
fourth indicators of times associated with the set of requests.

11. The server of claim 9, wherein:
the telemetry pertains, at least in part, to use of the set of network sockets; and
the telemetry comprises at least one of:
a type of file accessed via a network socket;
a file name accessed via a network socket;
a time of use of a network socket;
a location of use of a network socket; or
a use profile for a network socket.

12. The server of claim 9, wherein the set of network sockets is associated with a single host device.

13. The server of claim 9, wherein the set of network sockets is associated with a set of multiple host devices.

14. The server of claim 9, wherein the policy for network socket creation identifies at least one of:
a process allowed to create network sockets; or
a process prohibited from creating network sockets.

15. The server of claim 9, wherein the policy for network socket creation indicates at least one of:
a first set of port numbers or a first set of IP addresses that a process is allowed to use when requesting creation of a network socket; or
a second set of port numbers or a second set of IP addresses that a process is prohibited from using when requesting creation of a network socket.

16. The server of claim 9, wherein the policy for network socket creation indicates at least one of:
a first set of times when a process is allowed to request creation of a network socket; or
a second set of times when a process is prohibited from requesting creation of a network socket.

17. The server of claim 9, wherein:
the host device to which the policy for network socket creation is transmitted is a first host device; and
the processor is configured to create or update the policy for network socket creation using at least a portion of the telemetry received from a second host device.

18. The server of claim 9, wherein the telemetry is received from at least one agent instantiated on the at least one host device.

19. A method of providing network security for at least one host device, comprising:
receiving at a server, over a network and from the at least one host device, telemetry pertaining to creation or use of a set of network sockets used by the at least one host device to communicate over a network;
creating or updating, at the server and using the telemetry, a policy for network socket creation; and
transmitting the policy for network socket creation over the network to a host device.

20. The method of claim 19, further comprising:
transmitting the policy for network socket creation to each host device of the at least one host device.

\* \* \* \* \*